US009435270B2

(12) United States Patent
Leone et al.

(10) Patent No.: US 9,435,270 B2

(45) **Date of Patent: *Sep. 6, 2016**

(54) METHODS AND SYSTEMS FOR AN ENGINE

(71) Applicant: Ford Global Technologies, LLC, Dearborn, MI (US)

(72) Inventors: Thomas G. Leone, Ypsilanti, MI (US); John Anthony DeMarco, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 197 days.

This patent is subject to a terminal disclaimer.

(21) Appl. No.: 14/279,127

(22) Filed: May 15, 2014

(65) Prior Publication Data

US 2014/0249732 A1 Sep. 4, 2014

Related U.S. Application Data

(63) Continuation of application No. 13/271,961, filed on Oct. 12, 2011, now Pat. No. 8,763,385.

(51) Int. Cl.

| | |
|---|---|
| ***F16D 31/02*** | (2006.01) |
| ***F02D 41/00*** | (2006.01) |
| ***F02D 9/08*** | (2006.01) |
| ***F02D 9/10*** | (2006.01) |
| ***F02D 29/06*** | (2006.01) |
| ***F02D 11/10*** | (2006.01) |
| *F02D 9/02* | (2006.01) |
| *F02D 41/12* | (2006.01) |

(52) U.S. Cl.

CPC ............... *F02D 9/08* (2013.01); *F02D 9/1055* (2013.01); *F02D 11/10* (2013.01); *F02D 29/06* (2013.01); *F02D 41/0005* (2013.01); *F02D 41/12* (2013.01); *F02D 2009/0283* (2013.01); *F02D 2200/503* (2013.01)

(58) Field of Classification Search

CPC ........ F02D 9/08; F02D 11/10; F02D 9/1055; F02D 29/06; F02D 41/0005; F02D 41/12; F02D 2200/503; F02D 2009/0283

USPC ....... 60/397; 123/1 R, 361, 399; 290/1 R, 51

See application file for complete search history.

(56) References Cited

U.S. PATENT DOCUMENTS

| | | | |
|---|---|---|---|
| 4,774,810 | A | 10/1988 | Bidwell |
| 4,850,193 | A | 7/1989 | Kawamura |
| 5,394,848 | A | 3/1995 | Tsutsumi et al. |
| 5,544,484 | A | 8/1996 | Voss et al. |
| 5,559,379 | A | 9/1996 | Voss |
| 6,751,957 | B2 | 6/2004 | Morgan et al. |
| 6,922,995 | B2 | 8/2005 | Kawamura et al. |

(Continued)

*Primary Examiner* — Hoang Nguyen

(74) *Attorney, Agent, or Firm* — Julia Voutyras; Alleman Hall McCoy Russell & Tuttle LLP

(57) ABSTRACT

Various systems and methods for an engine system which includes a throttle turbine generator having a turbine which drives an auxiliary generator and disposed in a throttle bypass are described. In some examples, a throttle bypass valve is controlled to adjust airflow through the throttle bypass responsive to airflow to cylinders of the engine. In other examples, an operating parameter such as throttle position is controlled based on transient operating conditions of the engine. In still other examples, charging of a battery is coordinated between the auxiliary generator and a primary generator.

16 Claims, 8 Drawing Sheets

(56) References Cited

U.S. PATENT DOCUMENTS

| | | | | |
|---|---|---|---|---|
| 7,628,015 | B2 | 12/2009 | Marumoto et al. | |
| 8,763,385 | B2 * | 7/2014 | Leone | F02D 11/10<br>123/1 R |
| 2013/0092125 | A1 | 4/2013 | Leone et al. | |
| 2013/0092126 | A1 | 4/2013 | Leone et al. | |

* cited by examiner

METHODS AND SYSTEMS FOR AN ENGINE

CROSS REFERENCE TO RELATED APPLICATIONS

The present application claims priority to U.S. patent application Ser. No. 13/271,961, "METHODS AND SYSTEMS FOR AN ENGINE," filed on Oct. 12, 2011, the entire contents of which are hereby incorporated by reference for all purposes.

TECHNICAL FIELD

The present application relates to methods and systems for an engine system which includes a throttle turbine generator.

BACKGROUND AND SUMMARY

Some engine systems may include devices such as throttle turbine generators to use energy from a pressure difference across a throttle that is otherwise wasted in an intake passage of an engine. In some examples, the throttle turbine generator includes a turbine mechanically coupled to a generator which may generate current that is supplied to a battery of the engine. By charging the battery with such a generator, fuel economy of the engine system may be improved, as compared to charging the battery with an engine driven generator.

The turbine driven generator may not supply enough current to maintain the battery charge under some conditions, however. As such, the engine system may include a turbine driven generator (e.g., a throttle turbine generator) and an engine driven generator. In such a configuration, fuel economy of the engine may decrease when the engine driven generator is used, thereby decreasing the overall efficiency of the engine system.

The inventors herein have recognized the above problem and have devised an approach to at least partially address it. Thus, a method for an engine is disclosed. In one example, the method comprises, when a state of charge of a battery is less than a threshold, directing intake air through a throttle bypass around a throttle disposed in an intake passage of the engine and through a turbine to drive an auxiliary generator. The method further comprises, charging the battery via the auxiliary generator.

In such an approach, the battery may be charged by the auxiliary generator when the state of charge of the battery is less than the threshold. The threshold may be a first, high threshold which corresponds to a maximum state of charge of the battery, for example. In some examples, a mechanically driven primary generator may be used to charge the battery in addition to the auxiliary generator only under some conditions, such as when the state of charge is less than a second, low threshold or when a vehicle in which the engine is positioned is decelerating. In this manner, charging of the battery is coordinated between the primary generator and the auxiliary generator such that charging of the battery via the primary generator is reduced. As such, fuel consumption due to use of the primary generator may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for an engine with a throttle turbine generator. In one example embodiment, a method comprises, when a state of charge of a battery is less than a threshold, directing intake air through a throttle bypass around a throttle disposed in an intake passage of the engine and through a turbine to drive an auxiliary generator. The method further comprises charging the battery via the auxiliary generator. In such an example, the threshold may be a first, high threshold which corresponds to maximum state of charge of the battery. Thus, the auxiliary generator provides current to charge the battery whenever charging is needed while intake air is flowing through the throttle bypass. Under some conditions, however, such as during idle conditions when airflow through the throttle bypass may be cut-off, a mechanically driven primary generator may be used to charge the battery when the state of charge is less than a second, low threshold. In this way, charging of the battery by the primary generator may be carried out only under some conditions, such that fuel economy of the engine system is improved.

Figure 1:
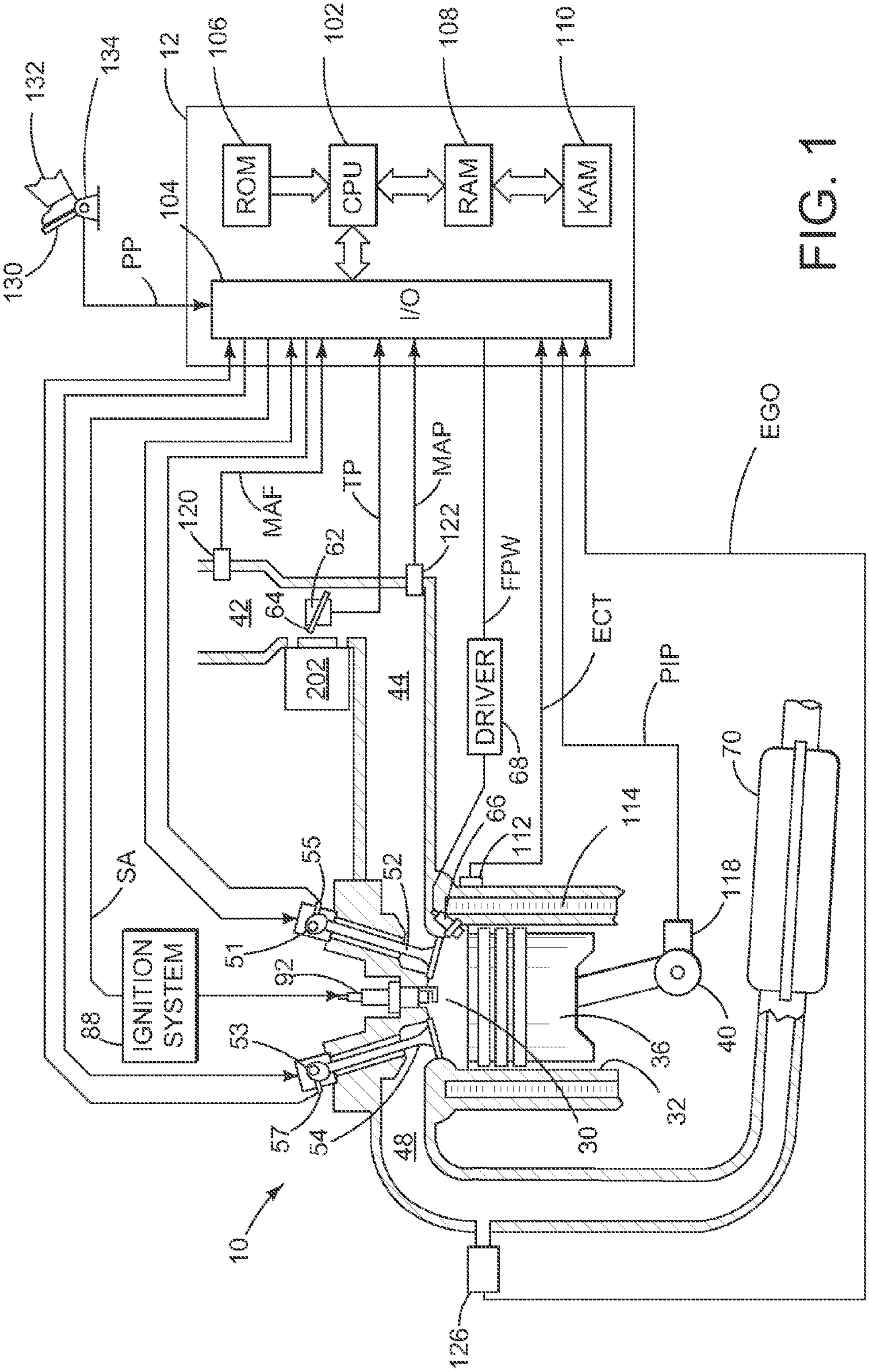
FIG. 1 shows a schematic diagram of an engine.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and/or a manifold absolute pressure sensor 122 for providing respective signals MAF and MAP to controller 12.

Further, a throttle turbine generator 202 is coupled to intake passage 42 in a bypass around throttle 62. Throttle turbine generator 202, which will be described in greater detail with reference to FIG. 2, includes a turbine which drives an auxiliary generator. The auxiliary generator may provide charge to a battery of the engine as a supplement to charging by a mechanically driven primary generator and/or as a main source of charging, for example when the primary generator degrades or fails.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and manifold absolute pressure signal, MAP, from sensor 122. Engine speed signal, RPM, may be generated by controller 12 from signal PIP. Manifold absolute pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, spark plug, etc.

Figure 2:
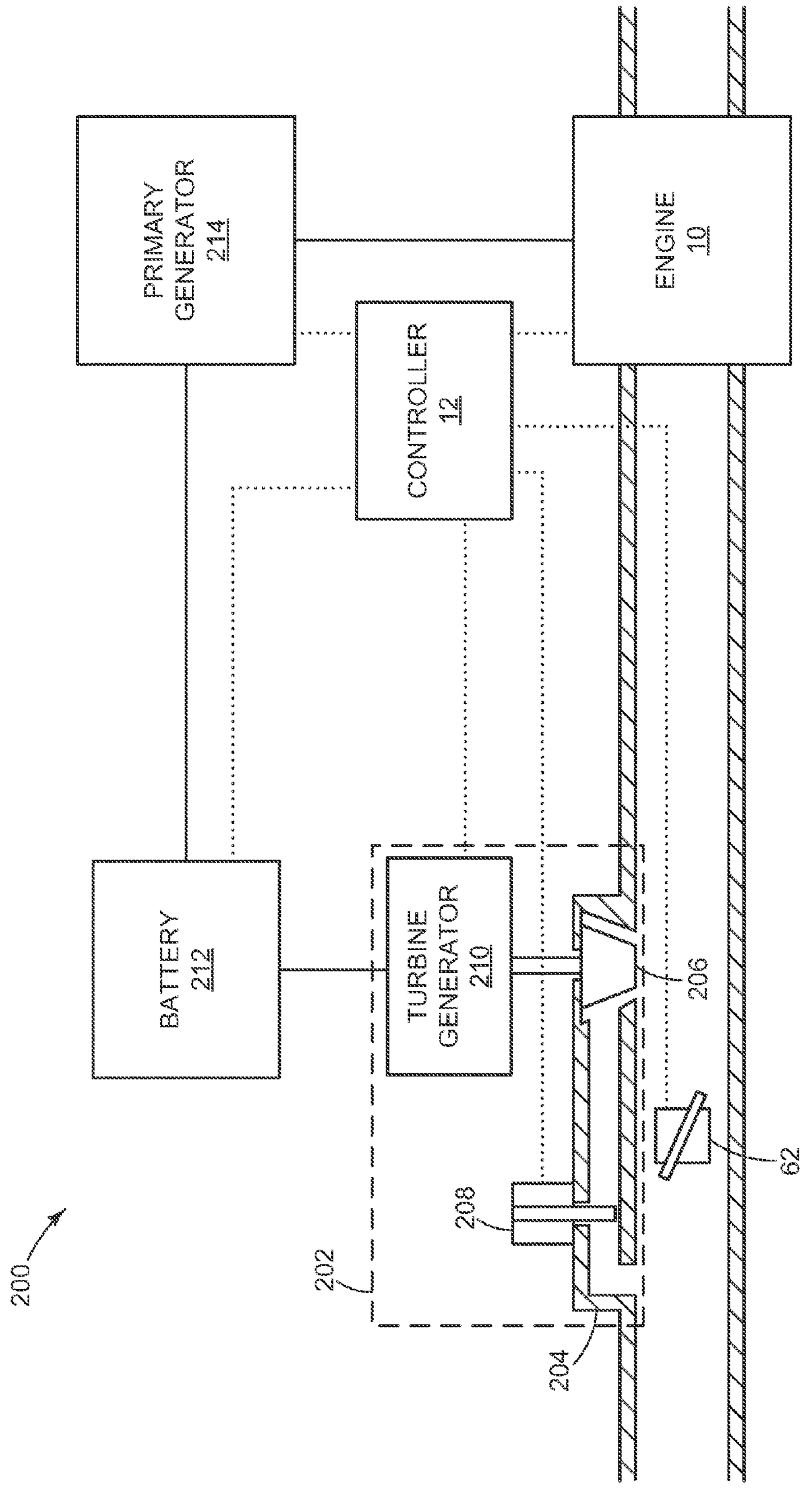
FIG. 2 shows a schematic diagram of a throttle turbine generator in an engine system.

Continuing to FIG. 2, throttle turbine generator 202 is shown in an engine system 200 which includes engine 10 described above with reference to FIG. 1. Throttle turbine generator 202 includes turbine 206 and throttle bypass valve 208 disposed in throttle bypass 204 and auxiliary generator 210 which is driven by turbine 206. In some embodiments, the throttle turbine generator may not include throttle bypass valve 208. Instead, the throttle may have a wedge-shaped blade, for example, which blocks airflow to the throttle bypass under some conditions.

Throttle turbine generator 202 uses energy that is typically wasted by throttling engine intake air. For example, the change in pressure across throttle 62 may be used to direct airflow through turbine 206. Turbine 206 drives auxiliary generator 210, which provides current to battery 212. In such a configuration, overall efficiency of the engine system may be improved, for example, as charging of battery 212 via mechanically driven primary generator 214 may be reduced and charging via auxiliary generator 210 may be increased during some operating conditions.

As depicted, intake air flows through intake passage 42 and through throttle 62. As described above, a throttle position may be varied by controller 12 such that an amount of intake air provided to cylinders of the engine is varied. Throttle bypass 204 directs intake air from a position upstream of throttle 62 and around throttle 62 to a position downstream of throttle 62. The intake air may be directed through throttle bypass 204 by a pressure difference across the throttle, for example. Further, in the example embodiment shown in FIG. 2, throttle turbine generator 202 includes throttle bypass valve 208. Throttle bypass valve 208 may be modulated to adjust the flow of intake air through throttle bypass 204, as described below with reference to FIG. 3. In some examples, throttle bypass valve 208 may be an on/off valve which opens and closes throttle bypass 204. In other examples, throttle bypass valve 208 may be a flow modulating valve which controls a variable amount of airflow through throttle bypass 204. Throttle bypass valve 208 may be a plunger or spool valve, a gate valve, a butterfly valve, or another suitable flow control device. Further, throttle bypass valve 208 may be actuated by a solenoid, a pulse width modulated solenoid, a DC motor, a stepper motor, a vacuum diaphragm, or the like.

Airflow directed through throttle bypass 204 flows through turbine 206 which spins auxiliary generator 210 with energy extracted from the airflow. Auxiliary generator 210 generates current which is supplied to battery 212. Battery 212 may provide power to various components of an electrical system of the vehicle in which engine system 200 is disposed, such as lights, pumps, fans, fuel injection, ignition, air-conditioning, and the like. Battery 212 may be further charged by primary generator 214 which is mechanically driven by engine 10. As described below with reference to FIG. 4, charging of battery 212 may be coordinated between primary generator 214 and auxiliary generator 210 such that overall efficiency of the system is increased. For example, auxiliary generator 210 may provide current to battery 212 during conditions when providing current to battery 212 from primary generator 214 would increase fuel consumption, such as during vehicle cruising or acceleration. Further, auxiliary generator 210 may provide current to battery 212 when primary generator 214 is degraded or failed. Auxiliary generator 210 may be a less powerful generator, for example, which generates less current than primary generator 214.

Figure 3:
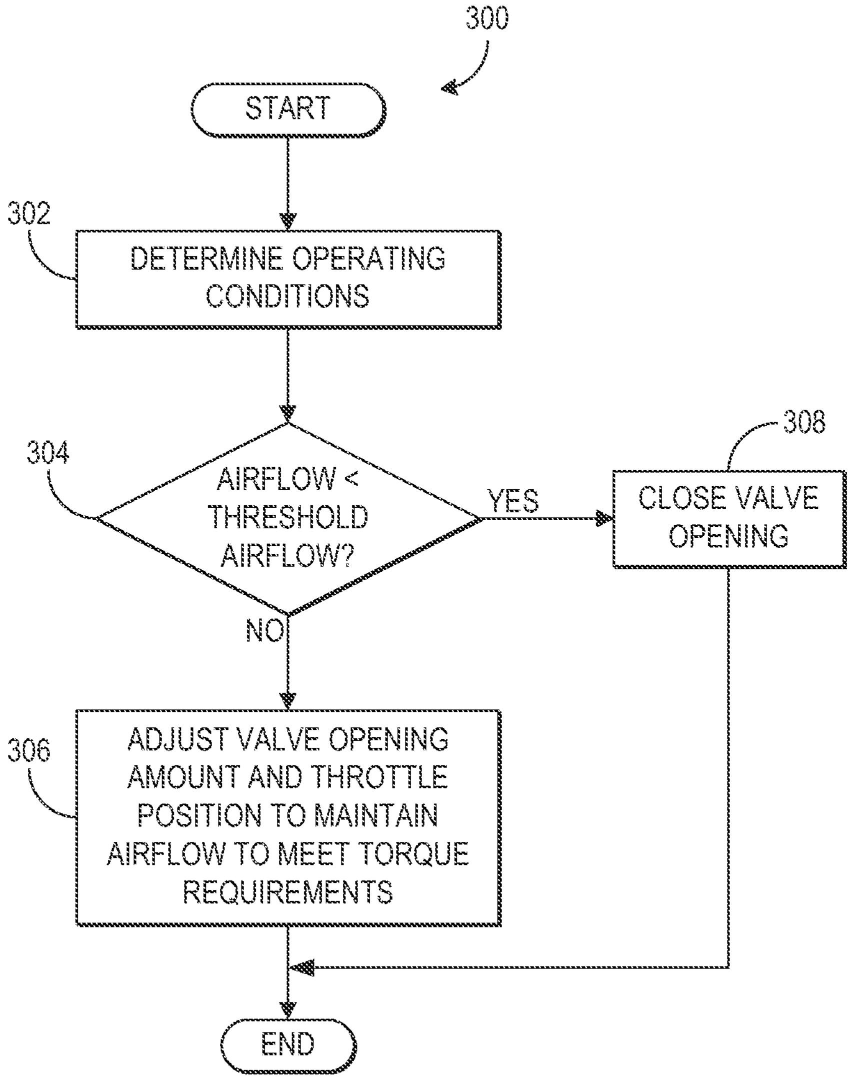
FIG. 3 shows a flow chart illustrating a routine for controlling a valve position of a throttle bypass valve in a throttle turbine generator.
Figure 4:
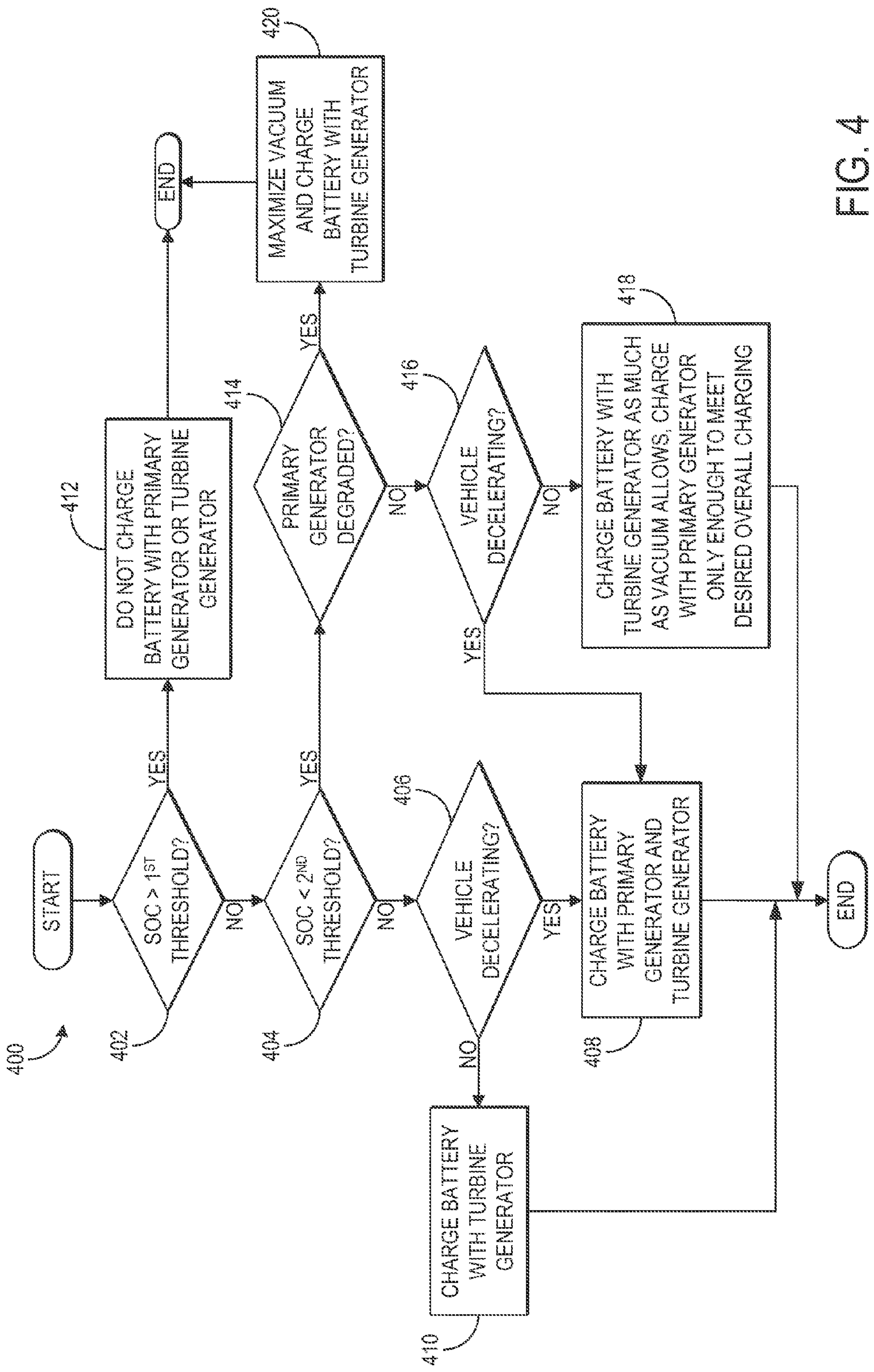
FIG. 4 shows a flow chart illustrating a routine for controlling charging of a battery in an engine system with a throttle turbine generator.
Figure 5:
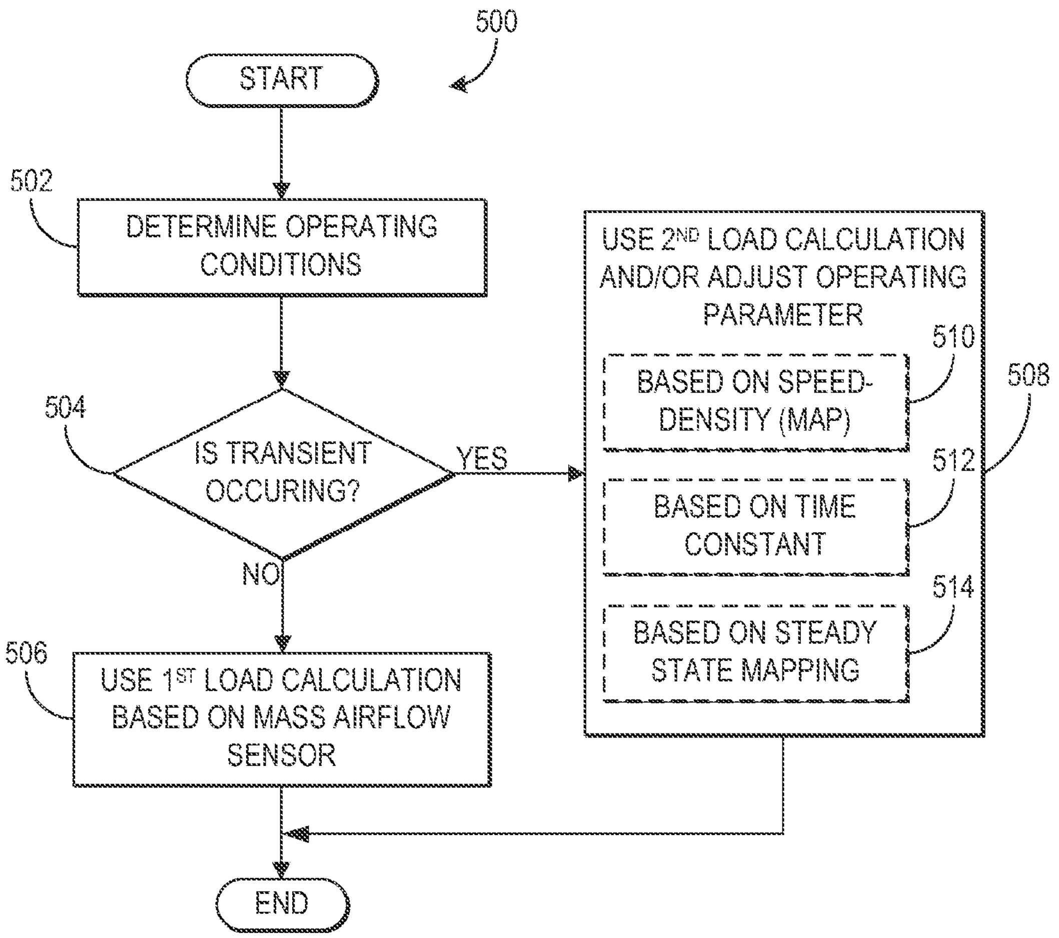
FIG. 5 shows a flow chart illustrating a routine for controlling airflow to an engine during a transient operating condition.

FIGS. 3-5 show flow charts illustrating control routines for operating an engine system with a throttle turbine generator, such as throttle turbine generator 202 described above with reference to FIG. 2. The flow chart in FIG. 3 shows a control routine for adjusting the throttle bypass valve to control airflow through the throttle bypass, and therefore, through the turbine, based on the airflow to the engine. The flow chart in FIG. 4 shows a control routine for charging the battery via the throttle turbine generator (e.g., the auxiliary generator) and the primary generator. The flow chart in FIG. 5 shows a control routine for adjusting airflow to the cylinders during a transient engine operating condition, such as when a throttle position changes rapidly and/or a speed of the turbine changes. Each routine may be carried out by the same controller at different times or simultaneously. For example, the throttle bypass valve may be controlled to adjust the airflow through the throttle bypass while the charging of the battery via one or both of the auxiliary generator and primary generator are controlled. As another example, during a transient condition, the throttle bypass valve may be adjusted based on the changing airflow through the throttle.

FIG. 3 shows a flow chart illustrating a control routine 300 for adjusting a throttle bypass valve to control airflow through a throttle bypass, such as the throttle bypass valve 208 described above with reference to FIG. 2. Specifically, routine 300 determines the airflow to the engine, and based on the airflow, adjusts the throttle bypass valve position. In some examples, the controller may use proportional integral derivative (PID) controls. In other examples, the controller may use open-loop control, or an open-loop component plus feedback. For example, the feedback may be airflow and the airflow may be actual measured airflow to cylinders of the engine and/or based on intake manifold pressure and/or engine speed.

At 302 of routine 300, operating conditions are determined. The operating conditions may include engine speed, engine load, intake air temperature and/or pressure (MAP) and/or flowrate (MAF), and the like.

Once the operating conditions are determined, routine 300 proceeds to 304 where it is determined if the airflow is less than a threshold airflow. The airflow used for this determination may be current measured airflow, or current airflow inferred from other parameters such as engine speed and MAP, or current desired airflow based on other parameters such as desired torque. Or the airflow used for this determination may be a predicted airflow which will occur soon, based on measured or inferred or desired parameters. The threshold airflow used for this determination may be a minimum airflow needed for the turbine to drive the auxiliary generator, for example. In some examples, the threshold airflow may be a constant value. In other examples, the threshold airflow may vary based on one or more operating parameters such as engine speed, engine load, intake air temperature and/or pressure, and engine temperature.

If it is determined that the first threshold airflow is less than the threshold airflow, routine 300 moves to 308 and the throttle bypass valve is closed. In some examples, the throttle bypass valve may be an on/off valve and the throttle bypass valve is closed by adjusting the throttle bypass valve to the off position. In other examples, the throttle bypass valve may be a flow modulating valve. In such an example, the throttle bypass valve is adjusted to a fully closed position to close the throttle bypass valve. For example, the throttle bypass valve may be adjusted to a fully closed position during an operating condition such as an idle engine condition.

On the other hand, if it is determined that the airflow is greater than the first threshold airflow, routine 300 continues to 306 where the throttle bypass valve opening amount and throttle position are adjusted to maintain airflow to the cylinders of the engine to meet torque requirements. For example, as a demand for torque increases, the throttle position may be adjusted such that the throttle is more open and airflow through the throttle increases. Likewise, the throttle bypass valve may be adjusted such that the throttle bypass opening increases as a torque demand increases. In some examples, however, the throttle bypass opening may be reduced while the throttle position is increased. For example, the throttle bypass opening may be reduced or closed when a state of charge of a battery which is charged by the throttle turbine generator approaches a threshold value and charging by the throttle turbine generator is no longer desired. As another example, the throttle bypass opening may be closed as the throttle position approaches wide open throttle.

In this manner, the throttle bypass valve may be controlled such that a desired airflow to the engine is maintained. For example, when the airflow is less than the threshold airflow, the valve opening is closed such that there is no airflow through the throttle bypass. When the airflow is greater than the threshold airflow, the valve opening and the throttle position are adjusted so that airflow to the cylinders of the engine is such that torque requirements are met while charging of the battery is carried out, if desired.

FIG. 4 shows a flow chart illustrating a control routine 400 for charging a battery in an engine system, such as battery 212 described above with reference to FIG. 2. Specifically, routine 400 determines a state of charge of the battery. Based on the state of charge of the battery and other operating conditions (e.g., vehicle deceleration, primary generator degradation, etc.), charging of the battery is carried out via one or more of a throttle turbine generator and a mechanically driven primary generator.

At 402 of routine 400, it is determined if the state of charge (SOC) of the battery is greater than a first threshold value. The first threshold value may be a high threshold which corresponds to a state of charge in which the battery is fully or maximally charged, for example. If it is determined that the state of charge of the battery is greater than the first threshold value, routine 400 moves to 412 and the battery is not charged with the primary generator or the throttle turbine generator.

On the other hand, if it is determined that the state of charge of the battery is less than the first threshold value, routine 400 proceeds to 404 and it is determined if the state of charge of the battery is less than a second threshold value. The second threshold value may be a low threshold which corresponds to a minimum charge level of the battery below which the battery may not provide sufficient power to operate various components of the electrical system of the vehicle, for example. As another example, the second threshold may correspond to a level of charge which may provide power for a particular duration. As such, the second threshold value is less than the first threshold value.

If it is determined that the state of charge of the battery is greater than the second threshold value, routine 400 continues to 406 where it is determined if the vehicle is decelerating. Vehicle deceleration may be determined if a speed of the vehicle is decreasing, if an operator of the vehicle is not applying pressure to an accelerator pedal, if an operator of the vehicle is applying pressure to brakes of the vehicle, and/or in another suitable manner.

If it is determined that the vehicle is decelerating, routine 400 proceeds to 408 where the battery is charged with the primary generator and the throttle turbine generator (e.g., the auxiliary generator). During deceleration of the vehicle, the primary generator may generate current to charge the battery without increasing fuel consumption via regenerative braking, for example. Further, the auxiliary generator may also provide current to charge the battery. In this way, charging of the battery may be maximized during deceleration of the vehicle.

On the other hand, if it is determined that the vehicle is not decelerating, routine 400 moves to 410 and the battery is charged with the throttle turbine generator. For example, because the state of charge of the batter is greater than the second threshold value and because charging the battery via the primary generator during non-deceleration conditions may increase fuel consumption, the battery may be charged solely via the auxiliary generator driven by the turbine of the throttle turbine generator.

Returning to 404, if it is determined that the state of charge of the battery is less than the second threshold value, routine 400 moves to 414 where it is determined if the primary generator is degraded. For example, generator degradation may be determined based on a decreasing level of current or voltage generated by the generator, a failure to provide current or voltage to the battery, or the like.

If it is determined that the primary generator is degraded, routine 400 moves to 420 and vacuum in the intake manifold is maximized such that charging of the battery via the turbine is increased. For example, increasing vacuum in the intake manifold increases the delta pressure across the throttle, thereby increasing a flow of intake air to the throttle bypass and increasing energy available for the turbine. Intake manifold vacuum may be increased by adjusting one or more of air fuel ratio, exhaust gas recirculation (EGR), variable valve timing, gear ratio, disabling cylinder deactivation, and turning on a mechanically driven vacuum pump, for example. In one example, the gear ratio may be adjusted by downshifting to increase vacuum in the intake manifold. As another example, an amount of exhaust gas recirculation may be reduced to increase vacuum in the intake manifold. In another example, the air fuel ratio may be decreased (e.g., running stoichiometric rather than lean) to increase vacuum in the intake manifold.

In some examples, such actions may be taken to increase intake manifold vacuum to increase charging by the auxiliary generator even when the primary generator is not degraded. However, in general, such actions may increase fuel consumption, thereby decreasing fuel economy. In some examples, the controller may calculate the fuel economy penalty of increasing intake manifold vacuum versus running the primary generator, and choose the more efficient way of increasing electrical output to the battery.

On the other hand, if it is determined that the primary generator is not degraded, routine 400 proceeds to 416 where it is determined if the vehicle is decelerating. As described above, vehicle deceleration may be determined if a speed of the vehicle is decreasing, if an operator of the vehicle is not applying pressure to an accelerator pedal, if an operator of the vehicle is applying pressure to brakes of the vehicle, and/or in another suitable manner, as described above.

If it is determined that the vehicle is decelerating, routine 400 moves to 408 and the battery is charged via the throttle turbine generator and the primary generator, as described above. For example, charging of the battery may be maximized, as it is charged via both the auxiliary generator and the primary generator while an impact on fuel economy due to charging with the primary generator is reduced.

On the other hand, if it is determined that the vehicle is not decelerating, routine 400 continues to 418 and the battery is charged via the throttle turbine generator as much as the intake manifold vacuum allows and the battery is charged with the primary generator only enough to meet desired overall charging of the battery. For example, because fuel economy may be decreased by increasing intake manifold vacuum, the battery may be charged via the auxiliary generator only as much as the current intake manifold vacuum allows. Similarly, because the primary generator may reduce fuel economy, the primary generator may be operated to generate current for the battery only enough to meet overall charging of the battery. As such, in some examples, the battery may be provided with more current from the auxiliary generator than the primary generator (e.g., when the pressure drop across the throttle is relatively high). In other examples, the battery may be provided with more current from the primary generator than the auxiliary generator (e.g., when the pressure drop across the throttle is relatively low).

In this manner, charging of the battery may be coordinated between the primary generator and the auxiliary generator such that overall efficiency of the system is increased. For example, during deceleration when a fuel economy penalty is low, current may be supplied to the battery from both the auxiliary generator and the primary generator, thereby maximizing charging of the battery. During conditions when a fuel economy penalty is high, current may be supplied to the battery from only the auxiliary generator such that fuel consumption is reduced.

Continuing to FIG. 5, a routine 500 for controlling airflow to the engine during transient conditions is shown. Specifically, routine 500 determines if a transient condition is occurring and adjusts the airflow to the cylinders of the engine (e.g., load) accordingly, while accounting for rotational inertia of the turbine. For example, the turbine can have significant rotational inertia, and a speed of the turbine may vary from zero revolutions per minute (RPM) at idle and relatively high loads when the throttle bypass valve is closed to over 70,000 RPM at low to medium loads. As such, transient changes in throttle position may not cause instantaneous corresponding changes in airflow.

At 502 of routine 500, operating conditions are determined. The operating conditions may include engine speed, engine load, intake air flow rate and/or pressure, throttle position, accelerator pedal position, ambient pressure, ambient temperature, and the like.

Once the operating conditions are determined, routine 500 proceeds to 504 where it is determined if a transient condition is occurring. For example, a transient condition may be identified based on a change in transmission gear ratio, a relatively rapid change in throttle or pedal position, a change in speed of the turbine, and/or changes in the intake manifold pressure or airflow.

If it is determined that a transient condition is not occurring (e.g., the engine is under a non-transient condition), routine 500 continues to 506 where airflow to the engine is determined using a first load calculation which is based on measurements from a mass airflow sensor. For example, because a transient condition is not occurring, the measured airflow directly corresponds to the airflow to the cylinders. Thus, the first load calculation may be based on a mass airflow measured by a mass airflow sensor positioned in an intake passage of the engine, such as mass airflow sensor 120 described above with reference to FIG. 1.

On the other hand, if it is determined that a transient condition is occurring, routine 500 moves to 508 where airflow to the engine is determined using a second load calculation and an operating parameter is adjusted based on the airflow to the cylinders of the engine. For example, the airflow into the cylinders (e.g., load) may be calculated via the second load calculation because the first load calculation may be inaccurate due to the delay caused by rotating inertia of the turbine.

Figure 6:
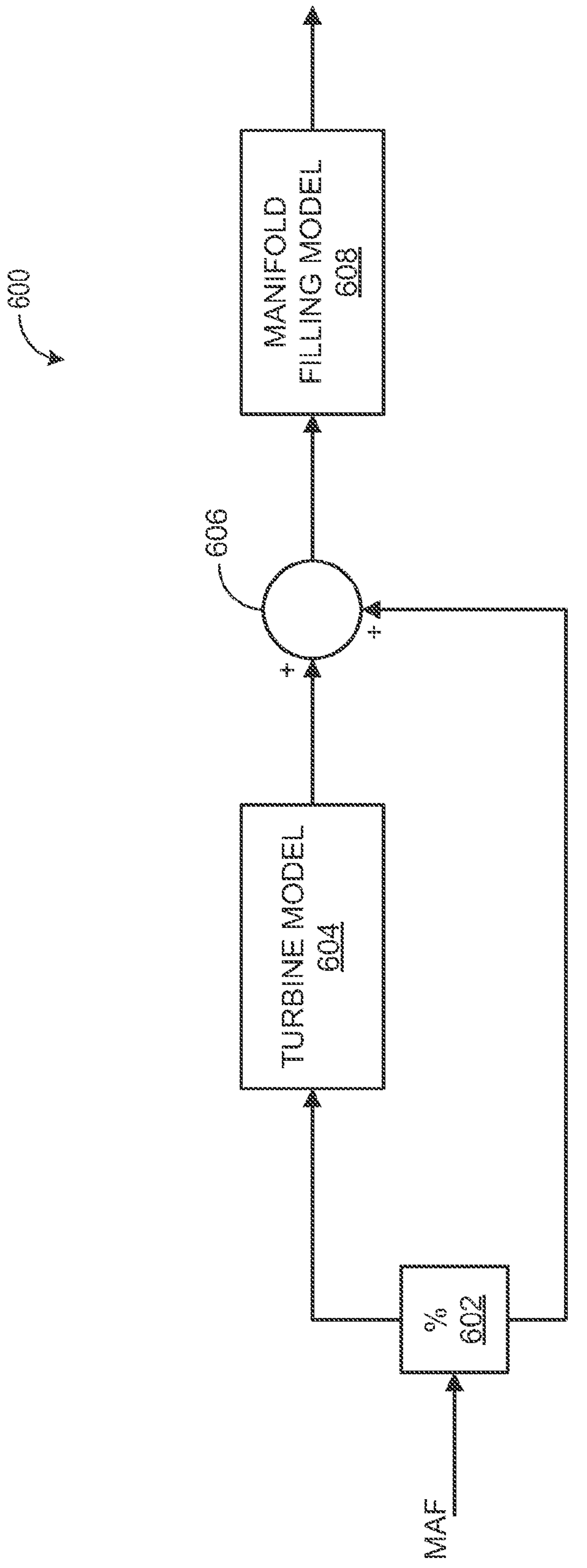
FIG. 6 shows a block diagram of an engine airflow calculation model.

As an example, at 510, speed-density calculated from manifold air pressure may be used instead of mass airflow to calculate the load. As another example, at 512, the load may be based on a time constant of the turbine. For example, the time constant may be a function of a parameter such as airflow through the throttle, change in pressure across the throttle, turbine speed, and/or current generated by the auxiliary generator. In one example, the airflow to the engine is determined based on an airflow model, such as engine airflow calculation model 600 shown in FIG. 6. In such an example, the airflow measured by the mass airflow sensor is proportioned at 602. For example, it is determined what percentage of the airflow is routed through the throttle bypass and what percentage of the airflow flows through the throttle. The percentage of airflow that is routed through the throttle bypass may vary based on the opening of the throttle bypass valve and the throttle position, for example. Likewise, the percentage of airflow that flows through the throttle may vary based on the opening of the throttle bypass valve and the throttle position.

As described above, due to the rotational inertia of the turbine during transient conditions, the airflow that leaves the turbine is different from the airflow entering the throttle bypass. As such, the percentage of airflow that passes through the throttle bypass, and therefore, the turbine, is adjusted by turbine model 604. Turbine model 604 may include applying one or more filters to the airflow percentage including a time constant of the turbine. For example, turbine model 604 may be an inertial model which quantifies the airflow delay of the turbine during transient conditions. In this manner, a flow through the throttle bypass and turbine and into the intake manifold may be determined.

After turbine model 604 is applied, the adjusted airflow and the percentage of airflow that passes through the throttle are summed at 606 to determine airflow through the intake manifold downstream of the throttle. Manifold filling model 608 is then applied to the airflow to determine the airflow into the cylinders of the engine (e.g., load). Manifold filling model 608 may depend on parameters such as size and volume of the intake manifold, engine speed, and variable valve timing, and the like.

Continuing with FIG. 5, once the airflow into the cylinders is calculated, one or more operating parameters, such as fuel injection timing and/fuel injection amount, may be adjusted according to the actual airflow. For example, one or more operating parameters may be adjusted responsive to a change in airflow due to the delay of a spinning up or spinning down of the turbine. In one example, fuel injection amount is reduced responsive to a decrease in the airflow. The decrease in the airflow may be due to an increase in the throttle opening and a delayed change in airflow due to rotational inertia of the turbine during the transient condition. As another example, fuel injection timing is retarded responsive to a decrease in the airflow to the cylinders of the engine. In this way, accuracy of air/fuel ratio control may be increased and exhaust emissions may be reduced, for example, during the transient operating condition.

In some examples, at 514, an operating parameter may be adjusted based on steady state mapping of airflow versus throttle position and change in pressure across the throttle. For example, the throttle position may be adjusted such that it is moved farther and/or faster to increase airflow through the throttle during the transient operating condition in response to a decrease in airflow through the throttle bypass due to the rotational inertia of the turbine. The modified throttle position may be based on a calculation of the throttle position needed to deliver the desired airflow during the transient condition (e.g., the transient airflow), after accounting for the time constant of the turbine, for example. In this way, accuracy of the delivery of desired torque may be increased, thereby increasing drivability, for example, during the transient operating condition.

In some examples, when a large increase in transient airflow is requested, such as during a tip in, the throttle bypass valve may be closed. In this manner, all of the intake airflow is available for the cylinders of the engine without a delay due to the rotational inertia of the turbocharger.

Thus, during transient engine operating conditions, one or more operating parameters may be adjusted such that engine operating efficiency and/or exhaust emissions and/or drivability may be increased.

Figure 7:
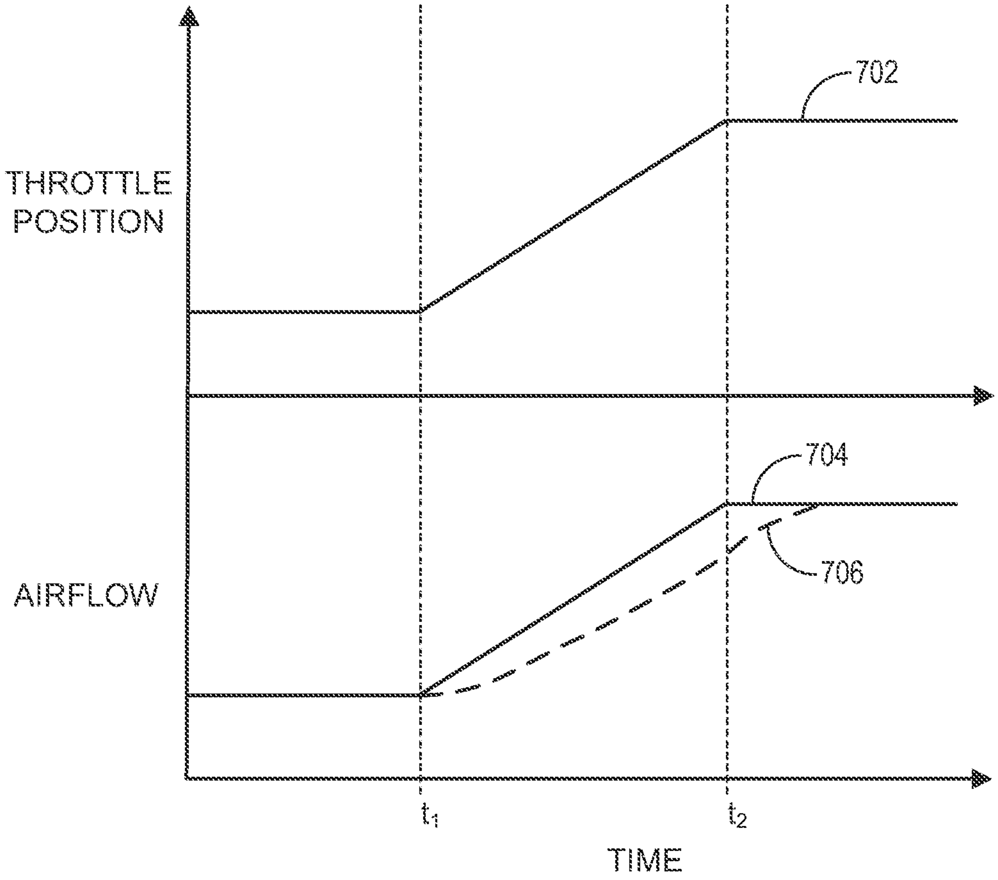
FIG. 7 shows graphs illustrating throttle position and airflow through the throttle during a transient operating condition.

FIG. 7 shows a graph illustrating airflow delay due to rotational inertia of the turbine during a transient operating condition. Solid line 702 shows the throttle position over time. As depicted, the throttle position starts out a first position and opens to a second position between time $t_1$ and time $t_2$. Solid line 704 shows the ideal airflow through the throttle to the intake manifold. The ideal airflow corresponds to the throttle opening such that as the throttle opens (or closes) airflow to the intake manifold increases (or decreases) by an amount corresponding to the change in opening of the throttle. Dashed line 706 shows the actual airflow through the throttle and the throttle bypass to the intake manifold. As shown, there is a delay in the increase in airflow between when the throttle opening increases and when the airflow increases. For example, the ideal airflow is not reached until some time after time $t_2$. This is due to the rotational inertia of the turbine as the speed of the turbine changes, for example.

Figure 8:
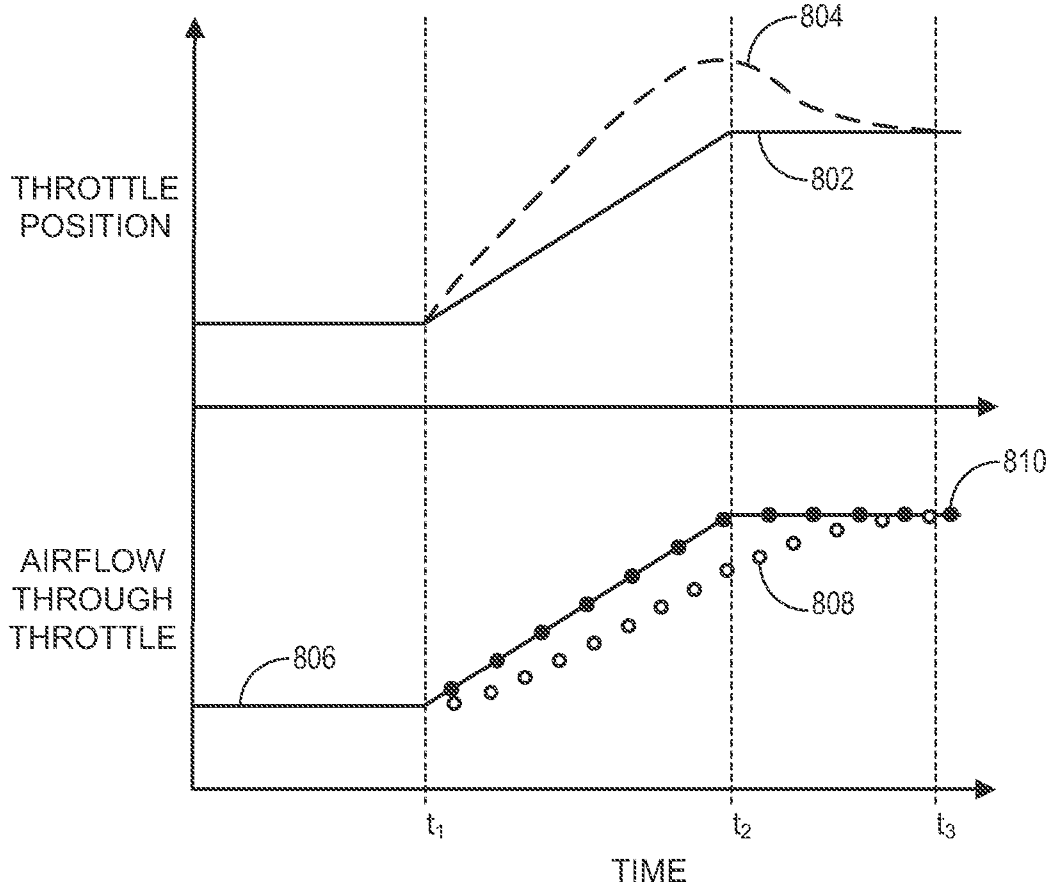
FIG. 8 shows graphs illustrating throttle position and airflow through the throttle during a transient operating condition.

FIG. 8 shows graphs illustrating a modified throttle control, which is described above with reference to FIG. 5. Solid line 802 shows the standard throttle position over time (e.g., the throttle position indicated by line 702 in FIG. 7) during a transient engine operating condition. Like the example shown in FIG. 7, the throttle position starts out at a first position and opens to a second position between time $t_1$ and time $t_2$. Dashed line 804 shows the modified throttle position. As depicted, according to the modified throttle control, the throttle is opened by a greater amount than the standard throttle starting at time $t_1$ and ending at time $t_3$.

Solid line 806 shows the airflow through the throttle corresponding to the throttle position indicated by line 802 in a system that does not include a throttle turbine generator. White-dotted line 808 shows the airflow through the throttle during a transient condition in a system that includes a throttle turbine generator, such as the engine system described above with reference to FIG. 1. As shown, the airflow through the throttle reaches the airflow corresponding to the second throttle position at time $t_3$, which is later than time $t_2$ due to decreased airflow through the throttle. Black-dotted line 810 shows the airflow through the throttle when the throttle position is adjusted according to a modified throttle control corresponding to throttle position line 804. As shown, by adjusting the throttle position in a system that includes a throttle turbine generator, the airflow through the throttle is substantially the same as the airflow through the throttle in a system that does not include a throttle turbine generator during a transient condition.

Thus, a routine, such as routine 500 described above with reference to FIG. 5, in which the throttle control is modified to adjust the throttle position during transient operating conditions may be carried out. In this manner, airflow through the throttle may remain substantially the same and a desired torque may be maintained during the transient condition.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for an engine, comprising:

when a state of charge of a battery is less than a threshold, directing intake air through a throttle bypass around a throttle disposed in an intake passage of the engine and through a turbine to drive an auxiliary generator;

charging the battery via the auxiliary generator;

during deceleration of a vehicle in which the engine is positioned, charging the battery via the auxiliary generator and a primary generator; and increasing intake manifold vacuum when the primary generator is degraded and charging the battery via the auxiliary generator.

2. The method of claim 1, wherein the threshold is a first, high threshold value, and further comprising charging the battery via the auxiliary generator when the state of charge is less than a second, low threshold value.

3. The method of claim 1, wherein the threshold is a first, high threshold value, and further comprising, during deceleration of the vehicle in which the engine is positioned, charging the battery via the auxiliary generator and the primary generator when the state of charge is less than a second, low threshold value.

4. The method of claim 1, wherein the threshold is a first, high threshold value, and further comprising charging the battery via the auxiliary generator and the primary generator when the state of charge is less than a second, low threshold value and the vehicle is not decelerating.

5. The method of claim 1, wherein the threshold is a first, high threshold value, and further comprising charging the battery via the auxiliary generator when the state of charge is less than a second, low threshold value and the primary generator is degraded.

6. The method of claim 5, further comprising adjusting one or more of variable valve timing, exhaust gas recirculation, gear ratio, cylinder deactivation, vacuum pump, and air fuel ratio to increase charging via the auxiliary generator when the primary generator is degraded.

7. A method for an engine, comprising:

during vehicle deceleration, directing intake air through a throttle bypass around a throttle disposed in an intake passage of the engine and through a turbine to drive an auxiliary generator to maintain a battery state of charge; and during degradation of a primary generator, increasing engine intake manifold vacuum to increase charging of a battery via the auxiliary generator.

8. The method of claim 7, wherein the degradation of the primary generator further includes the state of charge of the battery being less than a threshold.

9. The method of claim 8, wherein the engine is a direct fuel injection engine.

10. The method of claim 7, wherein increasing the engine intake manifold vacuum includes adjusting engine variable valve timing.

11. The method of claim 7, wherein increasing the engine intake manifold vacuum includes reducing exhaust gas recirculation.

12. The method of claim 7, wherein increasing the engine intake manifold vacuum includes downshifting a transmission gear ratio.

13. The method of claim 7, wherein increasing the engine intake manifold vacuum includes adjusting cylinder deactivation.

14. The method of claim 7, wherein increasing the engine intake manifold vacuum includes turning on a vacuum pump.

15. The method of claim 7, wherein increasing the engine intake manifold vacuum includes adjusting an air fuel ratio.

16. The method of claim 9, wherein during vehicle deceleration the method includes charging the battery via the auxiliary generator and the primary generator.

* * * * *